(12) United States Patent
Spadavecchia et al.

(10) Patent No.: US 11,155,388 B2
(45) Date of Patent: Oct. 26, 2021

(54) COVERED STORAGE BIN

(71) Applicant: Daniel Kelly, Medford, NJ (US)

(72) Inventors: John A. Spadavecchia, Red House, VA (US); Steven Kurth, Muskego, WI (US)

(73) Assignee: Daniel Kelly, Medford, NJ (US)

( * ) Notice: Subject to any disclaimer, the term of this patent is extended or adjusted under 35 U.S.C. 154(b) by 0 days.

(21) Appl. No.: 15/939,100

(22) Filed: Mar. 28, 2018

(65) Prior Publication Data
US 2018/0282029 A1    Oct. 4, 2018

Related U.S. Application Data

(60) Provisional application No. 62/478,282, filed on Mar. 29, 2017.

(51) Int. Cl.
| | |
|---|---|
| *B65D 43/16* | (2006.01) |
| *B65D 55/02* | (2006.01) |
| *B65D 21/02* | (2006.01) |
| *B65D 51/24* | (2006.01) |
| *B65D 1/22* | (2006.01) |
| *B65D 25/28* | (2006.01) |

(Continued)

(52) U.S. Cl.
CPC ............ *B65D 43/164* (2013.01); *B65D 1/22* (2013.01); *B65D 21/0215* (2013.01); *B65D 21/0219* (2013.01); *B65D 21/064* (2013.01); *B65D 25/205* (2013.01); *B65D 25/2888* (2013.01); *B65D 25/2897* (2013.01); *B65D 51/245* (2013.01); *B65D 55/02* (2013.01); *B65D 2251/1025* (2013.01); *B65D 2251/1058* (2013.01); *B65D 2251/1083* (2013.01); *B65D 2543/00194* (2013.01); *B65D 2543/00231* (2013.01); *B65D 2543/00296* (2013.01); *Y02W 30/80* (2015.05)

(58) Field of Classification Search
CPC ....... Y10S 292/11; B65D 55/12; B65D 55/02; B65D 55/10; B65D 43/164; B65D 2251/1083; B65D 21/064; B65D 51/245; B65D 2251/1025; B65D 2251/1058; B65D 25/205; E05C 3/044; E05C 17/46
USPC ....................... 70/73; 220/323, 251; 215/213
See application file for complete search history.

(56) References Cited

U.S. PATENT DOCUMENTS

| | | | | |
|---|---|---|---|---|
| 1,743,434 A | * | 1/1930 | Cramer | ............ E05C 3/043 |
| | | | | 292/202 |
| 1,762,596 A | * | 6/1930 | Soper | ............ B42F 7/12 |
| | | | | 211/126.12 |

(Continued)

FOREIGN PATENT DOCUMENTS

| | | | | |
|---|---|---|---|---|
| GB | 1366962 A | * | 9/1974 | ............ G09F 3/18 |
| WO | WO-9318975 A1 | * | 9/1993 | ............ B65D 43/164 |

*Primary Examiner* — Mollie Impink
(74) *Attorney, Agent, or Firm* — Massina Pat & TM Law PLLC (57) ABSTRACT

A storage bin including a box and a lid. The box includes a bottom and at least four walls extending from the bottom to an upper rim. The lid is configured to be positioned relative to the rim such that the lid closes the box. The lid defines a planar lid surface with an upwardly extending peripheral raised edge thereabout. A plurality of friction feet may be secured to the box bottom. The lid may include at least one lock assembly. The lid may include a label assembly.

16 Claims, 7 Drawing Sheets

(51) Int. Cl.
*B65D 25/20* (2006.01)
*B65D 21/06* (2006.01)

(56) References Cited

U.S. PATENT DOCUMENTS

| | | | | |
|---|---|---|---|---|
| 2,897,999 A * | 8/1959 | Bishop | ............... | B65D 21/0219 |
| | | | | 220/826 |
| 4,150,760 A * | 4/1979 | d'Orgelys | ............... | B65D 55/10 |
| | | | | 206/1.5 |
| 4,892,221 A * | 1/1990 | Gora | ................... | B65D 43/165 |
| | | | | 16/254 |
| 5,957,292 A * | 9/1999 | Mikkelsen | ........ | H01L 21/67373 |
| | | | | 206/454 |
| 6,000,576 A * | 12/1999 | Liu | ...................... | B65D 21/064 |
| | | | | 206/508 |
| 6,186,331 B1 * | 2/2001 | Kinpara | ............ | H01L 21/67772 |
| | | | | 206/454 |
| 6,350,418 B1 * | 2/2002 | Venderpool | ............... | A61L 2/24 |
| | | | | 206/363 |
| 7,380,358 B2 * | 6/2008 | Bazany | ................ | B65D 25/205 |
| | | | | 206/459.5 |
| 7,549,552 B2 * | 6/2009 | Hasegawa | ......... | H01L 21/67373 |
| | | | | 206/710 |
| 8,540,289 B2 * | 9/2013 | Nakatogawa | ..... | H01L 21/67373 |
| | | | | 292/159 |
| 2015/0217901 A1 * | 8/2015 | Bagley | ................... | A47J 47/08 |
| | | | | 220/8 |
| 2017/0251643 A1 * | 9/2017 | Boudreau | ........... | B65D 81/262 |
| 2018/0066463 A1 * | 3/2018 | Lepper | ................... | E05C 3/046 |

* cited by examiner

COVERED STORAGE BIN

This application claims the benefit of U.S. Provisional Application No. 62/478,282, filed on Mar. 29, 2017, the contents of which are incorporated herein by reference.

FIELD OF THE INVENTION

This disclosure relates to covered storage bins, also referred to as tote boxes. More particularly, this disclosure relates to storage bins with hinged top lids which are temporarily locked for sealing and thus to protect and keep intact the articles in the storage bins. Furthermore, the storage bins are stackable in a secure manner.

BACKGROUND OF THE INVENTION

Plastic storage bins or tote boxes have been known for a number of years and have found widespread usage in commercial and residential applications. Such boxes have been available having no lids, with one-piece lids which enclose the entire top of the box, or with two-piece lids, each piece of which is hinged along one side of the tote box and in which the pieces meet along a line of closure generally in the middle of the box top. These boxes are used for storing and transporting parts or other items and are reusable. The boxes and their lids are also typically made of plastic materials which are recyclable.

Plastic tote boxes having two piece lids are particularly troublesome when a heavy object is placed on the lid. The heavy object may cause the box sides to flex outward, separating the two-piece lid and allowing the object to fall into the box. The tote boxes of the type described are also often secured by strapping a band around the box exterior to keep the box sides from flexing outward and the lid from inadvertently opening. The band tends to dig into the box edges causing then to crack and fail. If the box is strapped over lid hinges, the hinges can be crushed by the tightened strap rendering the hinge inoperable.

Furthermore, packing slips are often required in a box for shipment. The packing slip is often available only after the box has been closed and stacked. This makes insertion of the slip into the box very difficult. Currently, in order to insert a packing slip in a closed stacked box, the box stack must be disassembled to the desired box and the box must be opened to insert the slip into the box.

SUMMARY OF THE INVENTION

In at least one embodiment, the present disclosure provides a storage bin including a box and a lid. The box includes a bottom and at least four walls extending from the bottom to an upper rim. The walls extend at an outward angle from the bottom to the rim. The lid is configured to be positioned relative to the rim such that the lid closes the box. The lid defines a planar lid surface with an upwardly extending peripheral raised edge thereabout. A plurality of friction feet are secured to the box bottom. Each friction foot including a planar portion configured to engage the planar lid surface of an adjacent storage bin and an upturned portion configured to engage the peripheral raised edge of the adjacent storage bin.

In at least one embodiment, the present disclosure provides a storage bin including a box and a lid. The box includes a bottom and at least four walls extending from the bottom to an upper rim. The lid is hingedly connected to the rim such that the lid closes the box when the lid is in a closed position. The lid defines a planar lid surface with an upwardly extending peripheral raised edge thereabout. A lock assembly is provided in the lid. The lock assembly includes a box slot extending through one of the walls, a depression in the lid which is in communication with a lid slot extending through the peripheral raised edge, and a lock arm positioned within the depression. The lock arm includes a body pivotally connected to the lid, a control member extending outwardly from the body and a latch member extending outwardly from the body and radially spaced from the control member. The control member is movable within the depression from a locked position wherein the latch member extends through the lid slot and into the box slot and an open position wherein the latch member is clear of the lid and box slots. In at least one embodiment, the lid includes first and second lid pieces and each lid piece is hingedly connected to the box and includes a lock assembly.

In at least one embodiment, the present disclosure provides a storage bin including a box and a lid. The box includes a bottom and at least four walls extending from the bottom to an upper rim. The lid is configured to be positioned relative to the rim such that the lid closes the box. The lid defines a planar lid surface. A label assembly is provided in the lid. The label assembly includes a depression in the lid, a label configured to be positioned within the depression, and a label cover configured to be releasably secured in the depression over a label positioned therein. The label cover has a top surface which is co-planar with or below the planar lid surface when the label cover is secured in the depression.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIGS. 1-6, a storage bin 10 in accordance with an exemplary embodiment of the disclosure will be described. The storage bin 10 includes a box 20 and a lid 40. Both the box 20 and the lid 40 are preferably molded plastic, for example polypropylene. The box 20 has a bottom 25, longitudinally extending sides 21,23, and laterally extending end walls 22, 24. At the top of the side 21, 23 and end walls 22, 24, a rim 26 encircles the top of the box 20. In the illustrated embodiment, a handle 28 is formed at the midpoints of the end walls 22 and 24.

Preferably the walls 21-24 taper outwardly at a certain draft angle from the bottom 25 up so that one box 20 can be nested inside another box 20 with the lid 40 open. Alternatively, the boxes 20 can be stacked by placing one box 20 on the closed lid 40 of another storage bin 10. To assist in stabilizing the stacked storage bins 10, in the illustrated embodiment, each lower corner of the box 20 includes a friction foot 36. Each friction foot 36 includes a planar portion 37 configured to extend along the bottom 25 of the box 20 and an upturned portion 38 configured to extend along the respective walls 21-24. A connector 39 extends from each planar portion 37 and is configured to be received in a respective slot 27 in the box 20 to connect the friction foot 36 to the box 20. Other connection assemblies, for example, adhesive or integral molding, may be utilized. As described below in more detail, the engagement of the friction feet 36 with the lid surface 44 and a raised peripheral edge 47 of the lid 40, helps to securely maintain the storage bins 10 in a stacked configuration. Additionally, the friction feet 36 may be configured to slow the box 20 on certain conveying equipment, such as sliding from one level to another.

Figure 7:
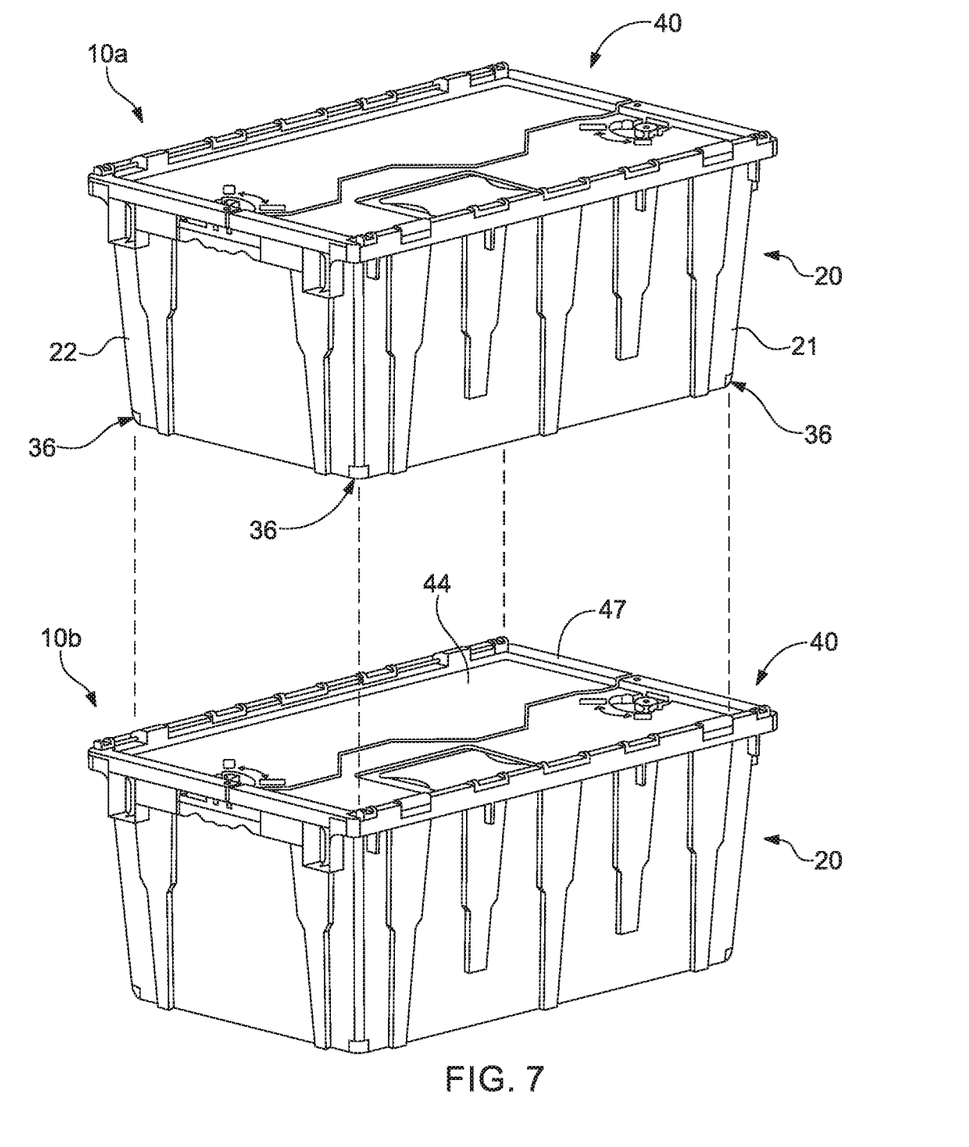
FIG. 7 is an isometric view of an exemplary storage bin in accordance with an embodiment of the invention positioned for stacking on another exemplary storage bin.
Figure 9:
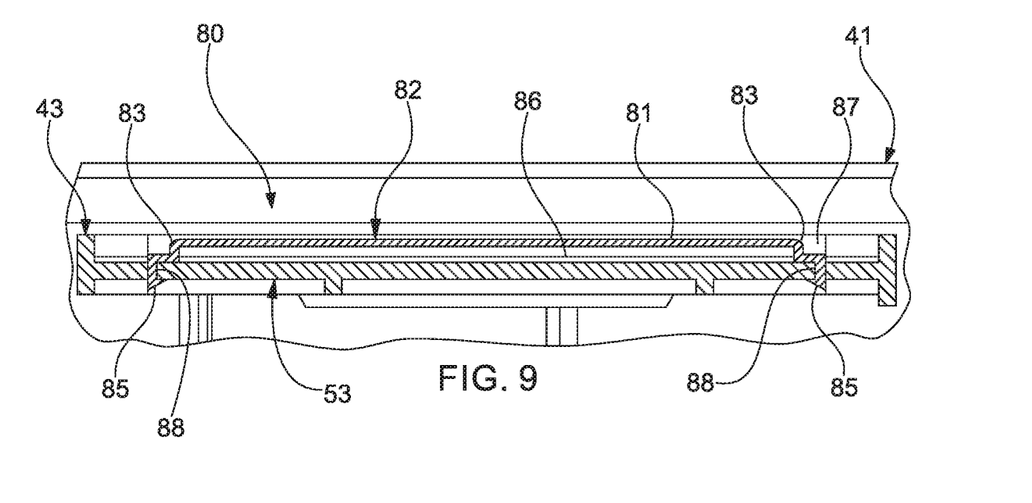
FIG. 9 is a cross-sectional view along the line 9-9 in FIG. 8.

The lid 40 is hingedly attached to the respective sidewalls 21, 23. The lid 40 is formed from two pieces 41, 42 hinged along the top of the adjacent respective side wall 21, 23, and has a top side 43 and an underside 53 (see FIG. 9). The lid top side 36 is a substantially central planar surface 44 surrounded by a raised peripheral edge 47. The peripheral edge 47 is formed as an integral part of the pieces 41, 42 and is defined by raised longitudinal edges 45 along the top of each box sidewall 21, 23 and raised end lips 46. The raised lips 46 wrap over the rim 26 above the box end walls 22, 24. Referring to FIG. 7, with the tapered walls 21-24, the friction feet 36 of a first storage bin 10a align within the raised edge 47 of a second storage bin 10b upon which the first is placed. Once placed, the planar portion 37 of each friction foot 36 sits on the central planar surface 44 and the upturned portion 38 of each friction foot 36 engages the raised edge 47, thereby helping prevent the storage bin 10a from slipping off of the closed lid 40 of the storage bin 10b.

Figure 1:
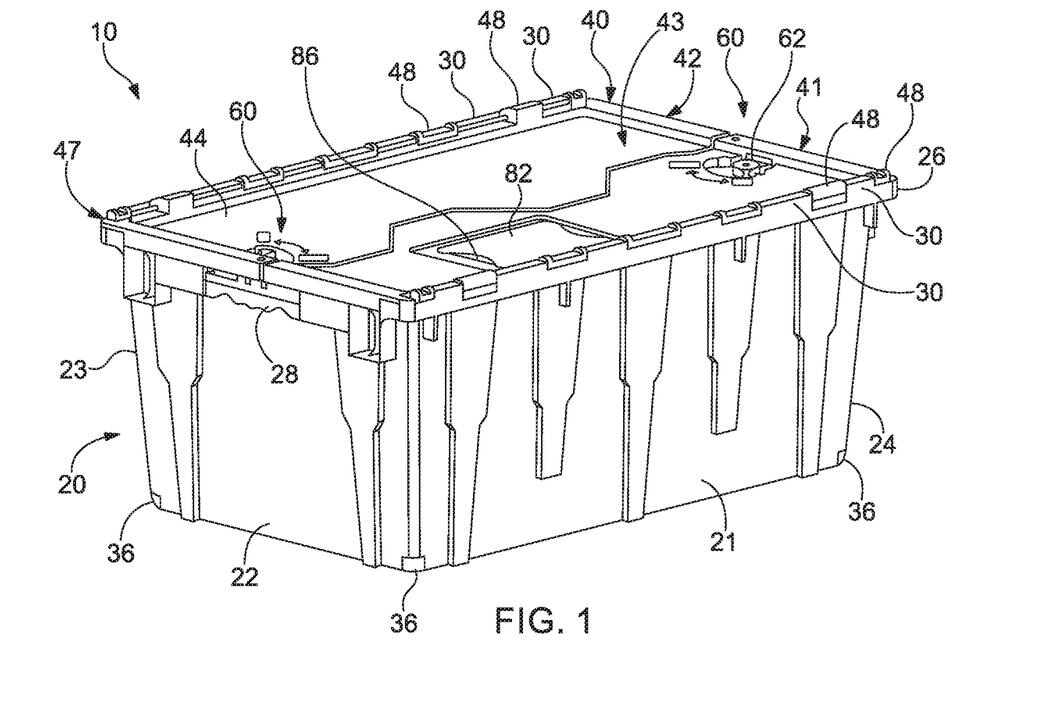
FIG. 1 is an isometric view of a covered storage bin in accordance with an exemplary embodiment of the disclosure.
Figure 2:
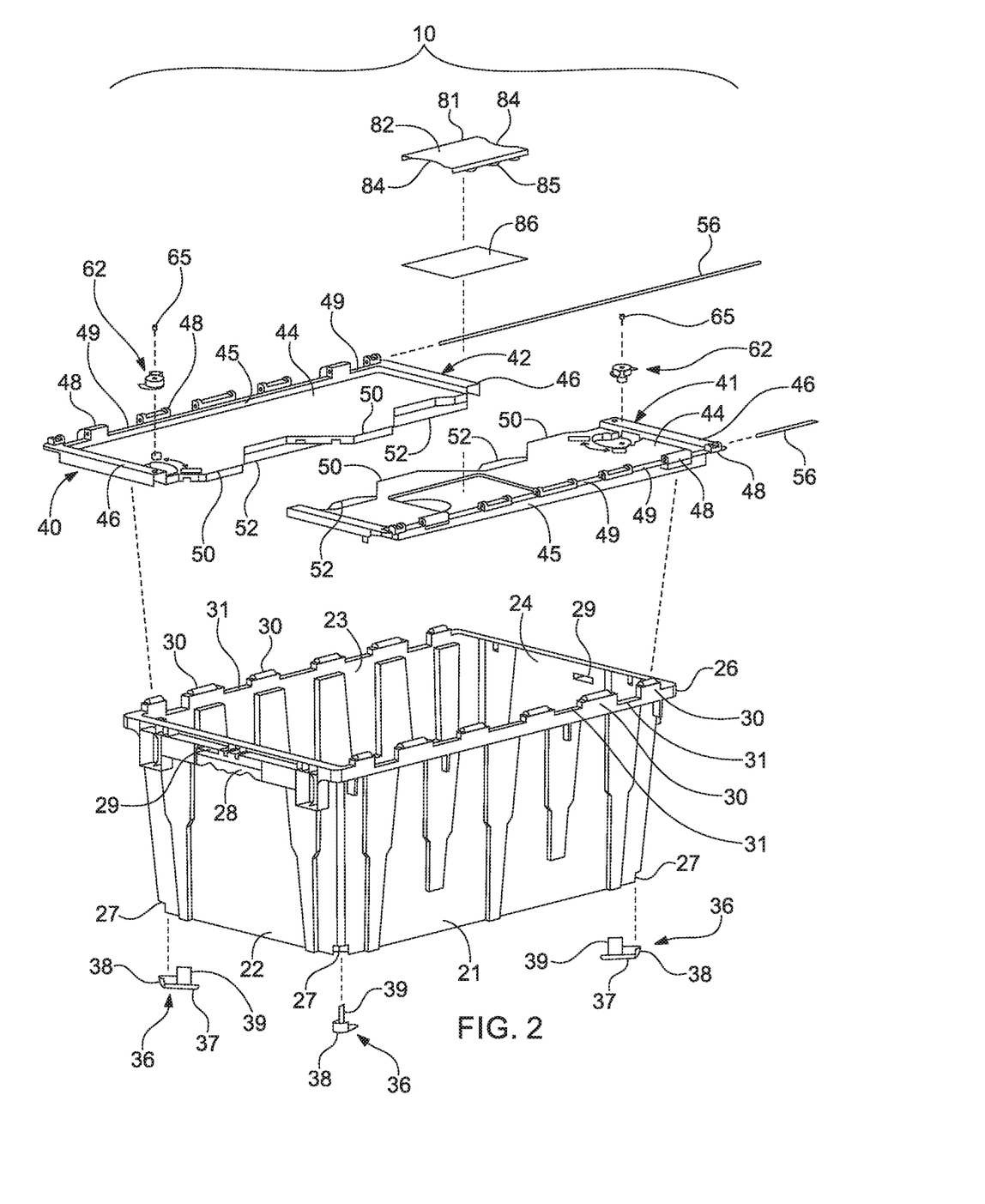
FIG. 2 is an exploded isometric view of the covered storage bin of FIG. 1.

The hinge connections will be described with respect to FIGS. 1-3. Each hinge connection includes a plurality of pivot seats 30 extending along the top of each side 21, 23. Each pivot seat 30 defines a longitudinal axle hole. Notches 31 are provided between adjacent pivot seats 30. Each lid piece 41, 42 includes a plurality of pivot seats 48 along each outer lateral edge, with notches 49 provided between adjacent pivot seats 48. Each pivot seat 48 defines a longitudinal axle hole. Each of the top lid pieces 41, 42 is positioned relative to a respective side 21, 23 such that the lid pivot seats 48 are received in the side wall notches 31 and the wall pivot seats 30 are received in the lid notches 49. With the lid pieces 41, 42 so positioned, the axle holes are longitudinally aligned and a respective axle 56 is positioned therethrough. With each axle 56 extending through the respective axle holes, each lid piece 41, 42 is hingedly connected to the container box 20.

Figure 3:
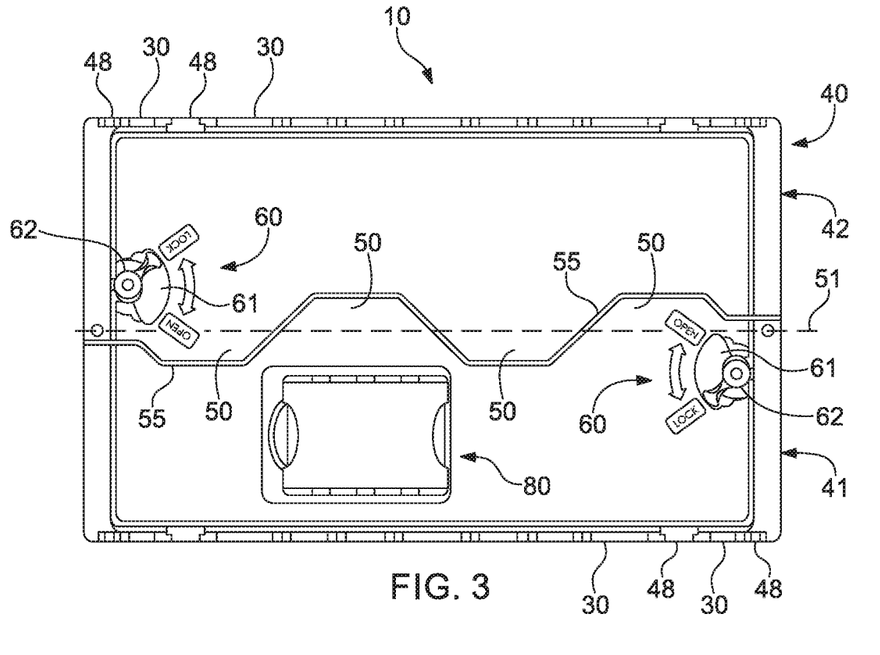
FIG. 3 is a top plan view of the covered storage bin of FIG. 1.
Figure 4:
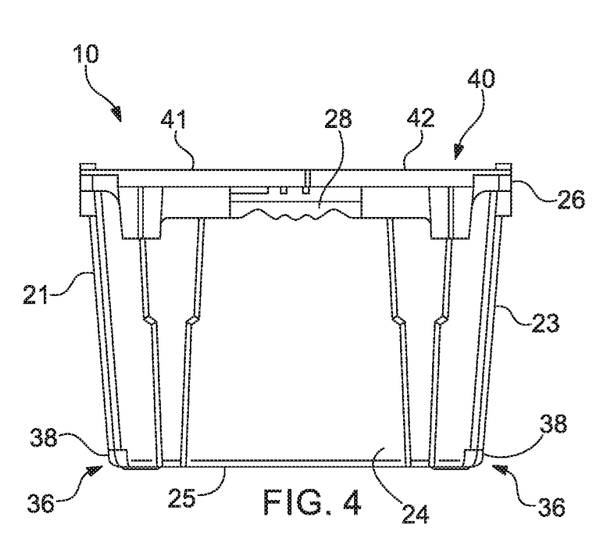
FIG. 4 is an end elevation view of the covered storage bin of FIG. 1.
Figure 5:
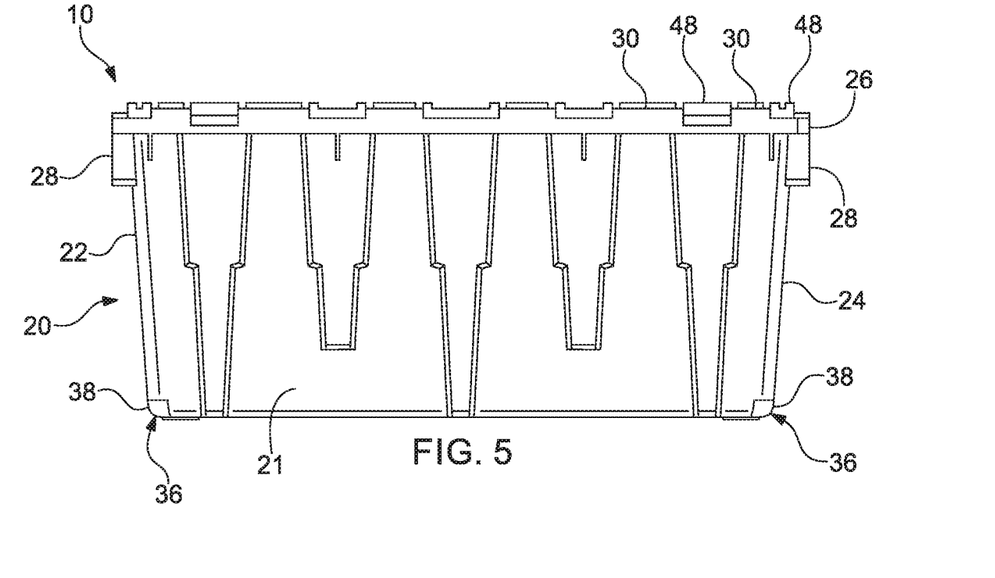
FIG. 5 is a side elevation view of the covered storage bin of FIG. 1.
Figure 6:
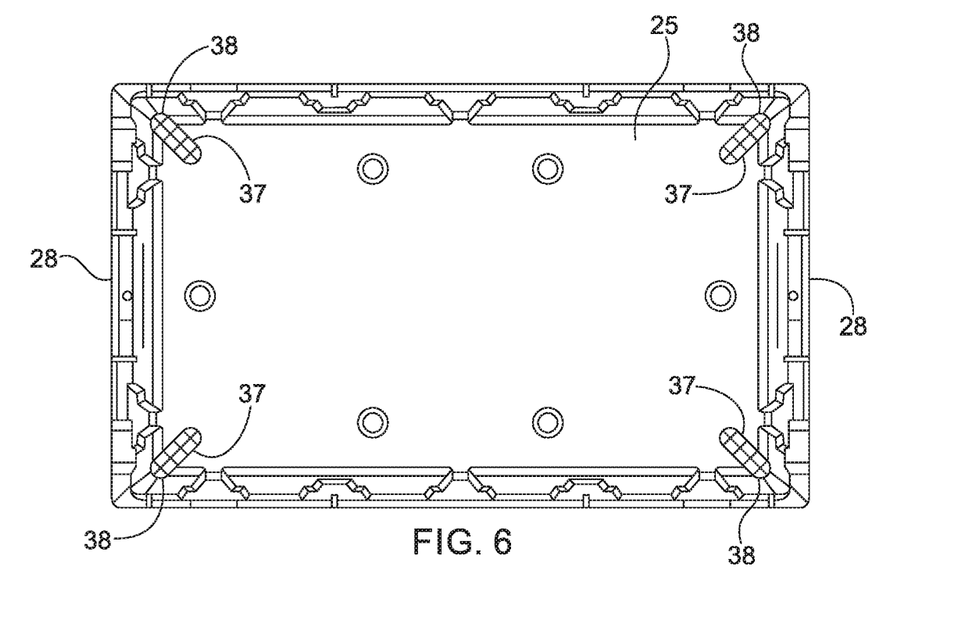
FIG. 6 is a bottom plan view of the covered storage bin of FIG. 1.

Each lid piece 41, 42 meets with the other piece in the middle of the box 20 along a substantially straight longitudinal line of closure 51 on the underside 53 of the lid 40 (see FIG. 3). The lid pieces 41, 42 are locked together along the line of closure 51 with engagement structures of any suitable construction. In the illustrated embodiment, each piece 41, 42 has a plurality of overlapping flaps 50 which extend beyond the line of closure 51 to an underlapping shelf 52 which extends from a shelf base to the line of closure 51. Each overlapping flap 50 engages a complementary underlapping shelf 52 of the opposite piece 41, 42 such that a zig-zag line of closure 55 is defined on the lid top side 43.

Figure 8:
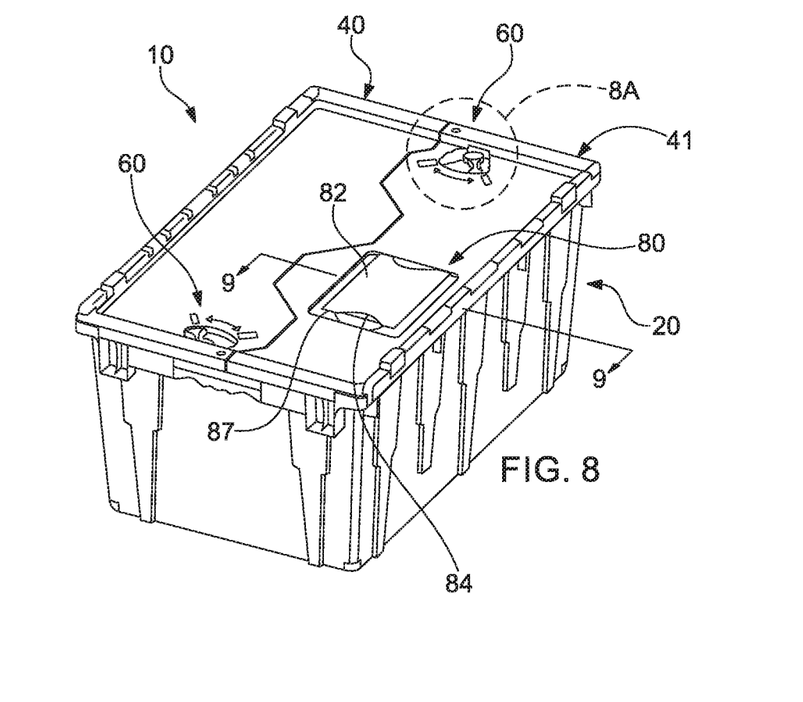
FIG. 8 is an isometric view of an exemplary storage bin with an exemplary lock assembly shown in expanded view.
Figure 8A:
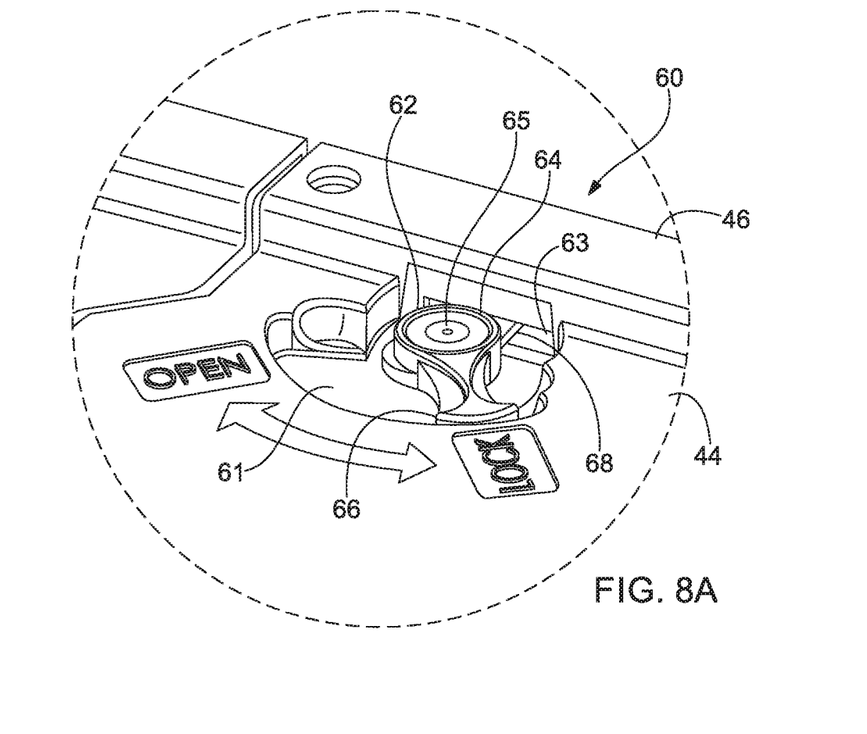

To maintain the lid 40 in a closed position, each of the lid pieces 41, 42 includes a lock assembly 60. An exemplary lock assembly 60 will be described with reference to FIGS. 2, 3 and 8. Each lock assembly 60 includes a lock arm 62 positioned within a depression 61 in the lid planar surface 44, proximate to the raised end lip 46. The depression 61 is in communication with a through slot 63 extending through the end lip 46 and which is aligned with a slot 25 (see FIG. 2) in the respective end wall 22, 24 when the lid piece 41, 42 is in a closed position. The lock arm 60 includes a body 64 which is pivotally mounted to the lid piece 41, 42 via a screw 65 or the like. A control member 66 and a latch member 68 each extend from the body 64, radially spaced from one another, for example, by approximately 135°. This angle is for illustration only and other angles may be utilized. The control member 66 is movable within the depression 61 and thereby controls the position of the latch member 68. The control member 66 is movable between a locked position in which the latch member 68 extends through the slot 63 and into the slot 25, as illustrated in FIG. 8, and an open position wherein the latch member 68 is clear of the slots 25, 63. In the locked position, the latch member 68 engages the respective side wall 22, 24 of the box 20 and thereby prevents pivoting of the lid piece 41, 42.

Referring to FIGS. 1-3, 8 and 9, the illustrated lid piece 41 also includes a label assembly 80. The illustrated label assembly 80 includes a cover 82 configured to cover and lock a label 86 within a recess 87 in the lid planar surface 44. The cover 82 is preferably manufactured from a transparent material so the label 86 remains visible. The illustrated cover 82 includes depending side edges 83 with one or more projections 85 extending from each side edge 83. The projections 85 extend through corresponding slots 88 through the lid piece 41 and engage the underside 53 of the lid 40 to retain the cover 82 in position. When positioned in the depression 87, the cover 82 is preferably co-planar with or below the top side 43 of the lid 40. Cutouts 84 at one or both ends of the cover 82 allow the cover 82 to be gripped and pulled away from the lid piece 41 to remove the cover 82 and access the label 86. The projections 85 are configured to snap from the slots 88 upon application of sufficient force.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A storage bin comprising:
a box including a bottom and at least four walls extending from the bottom to an upper rim;
a lid hingedly connected to the rim such that the lid closes the box when the lid is in a closed position, the lid defining a planar lid surface with an upwardly extending peripheral raised edge thereabout; and
a lock assembly including a box slot extending through one of the walls, a depression in the lid which is in communication with a lid slot extending through the peripheral raised edge at a location below the planar lid surface, and a lock arm positioned within the depression, the lock arm including a body pivotally connected to the lid, a control member extending outwardly from the body and a latch member extending outwardly from the body and radially spaced from the control member in fixed relation to the control member, the control member moveable within the depression from a locked position wherein the latch member extends through the lid slot and into the box slot and an open position wherein the latch member is clear of the lid and box slots.

2. The storage bin according to claim 1 wherein the lid includes first and second lid pieces, each lid piece hingedly connected to the box and each including a lock assembly.

3. The storage bin according to claim 2 wherein the first and second lid pieces overlap one another.

4. The storage bin according to claim 3 wherein the first and second lid pieces have interlocking tabs.

5. The storage bin according to claim 1 wherein the control member and the latch member are radially spaced from one another by approximately 135°.

6. The storage bin according to claim 2 wherein each of the first and second lid pieces includes a hinge connection, with each hinge connection including a plurality of pivot seats along an outer lateral edge of each lid piece with notches provided between adjacent pivot seats and wherein each of the lid pieces is positioned relative to a respective side such that the lid pivot seats are received in the side wall notches of respective side walls and wall pivot seats are received in the lid notches.

7. The storage bin according to claim 1 wherein the at least four walls extend at an outward angle from the bottom to the rim; and a plurality of friction feet are secured to the box bottom, each friction foot including a planar portion configured to engage the planar lid surface of an adjacent storage bin and an upturned portion configured to engage the peripheral raised edge of the adjacent storage bin.

8. The storage bin according to claim 7 wherein a connector extends from each planar portion and is configured to be received in a respective slot in the box to connect the friction foot to the box.

9. The storage bin according to claim 7 wherein the engagement of the friction feet with the lid surface and the peripheral raised edge of the lid maintains the storage bins in a stacked configuration.

10. The storage bin according to claim 7 wherein the planar portion of each of the friction feet extends from the box bottom such that the planar portions engage conveying equipment and thereby slow movement of the bin.

11. The storage bin according to claim 1 further comprising a label assembly including a depression in the lid, a label configured to be positioned within the depression, and a label cover configured to be releasably secured in the depression over a label positioned therein, the label cover having a top surface which is co-planar with or below the planar lid surface when the label cover is secured in the depression.

12. The storage bin according to claim 11 wherein the label cover is manufactured from a transparent material.

13. The storage bin according to claim 11 wherein the label cover includes depending side edges with one or more projections extending from each side edge.

14. The storage bin according to claim 13 wherein the projections extend through corresponding slots through the lid piece and engage an underside of the lid to retain the label cover in position.

15. The storage bin according to claim 1 wherein the control member is accessible such that the control member is configured to be directly contacted to move the control member between the locked and open positions.

16. The storage bin according to claim 1 wherein the depression widens moving from the peripheral raised edge to an inner portion of the lid.

* * * * *